United States Patent [19]

Fusco et al.

[11] Patent Number: 4,747,747

[45] Date of Patent: May 31, 1988

[54] CONVEYOR FOR LOADING AND UNLOADING VEHICLES AND STORAGE FACILITIES

[76] Inventors: Salvatore M. Fusco, 5128 E. Thomas, Phoenix, Ariz. 85018; Lloyd Fogel, 6150 N. 29th St., Phoenix, Ariz. 85016

[21] Appl. No.: 859,906

[22] Filed: May 5, 1986

[51] Int. Cl.$^4$ ................................................ B60P 1/38
[52] U.S. Cl. .................................... 414/528; 198/834; 198/847
[58] Field of Search ............... 414/519, 521, 527, 528; 198/750, 834, 847

[56] References Cited

U.S. PATENT DOCUMENTS

| | | |
|---|---|---|
| 1,030,155 | 6/1912 | Barnhart . |
| 1,304,026 | 5/1919 | Craymer . |
| 1,927,653 | 9/1933 | Wehr . |
| 2,059,063 | 10/1936 | Tourville .............................. 198/834 |
| 2,563,418 | 8/1951 | Peter et al. ........................ 414/528 X |
| 3,342,354 | 9/1967 | Behr ..................................... 414/521 |
| 3,529,738 | 9/1970 | Hunt .................................. 414/528 X |
| 3,722,717 | 3/1973 | Stryczek . |
| 3,905,494 | 9/1975 | Yatagai et al. ...................... 414/528 |
| 3,913,760 | 10/1975 | Koral ................................... 414/528 |
| 3,917,092 | 11/1975 | McGinnis ............................ 414/528 |
| 3,998,343 | 12/1976 | Fors . |
| 4,149,642 | 4/1979 | Schneider ....................... 414/528 X |
| 4,316,536 | 2/1982 | Verbeek .............................. 198/847 |
| 4,518,303 | 5/1985 | Moser ................................. 414/528 |
| 4,568,320 | 2/1986 | Tangorra ........................ 198/834 X |

Primary Examiner—Peter A. Aschenbrenner
Attorney, Agent, or Firm—Warren F. B. Lindsley

[57] ABSTRACT

An improved conveyor for loading truck trailers comprising a welded frame for strength employing a distributed array of small rollers for reducing friction under a resilient conveyor belt. The belt incorporates reinforced perforations at its edges for engaging cogged rollers of a driving wheel and transverse stiffeners across the belt to distribute driving forces.

3 Claims, 2 Drawing Sheets

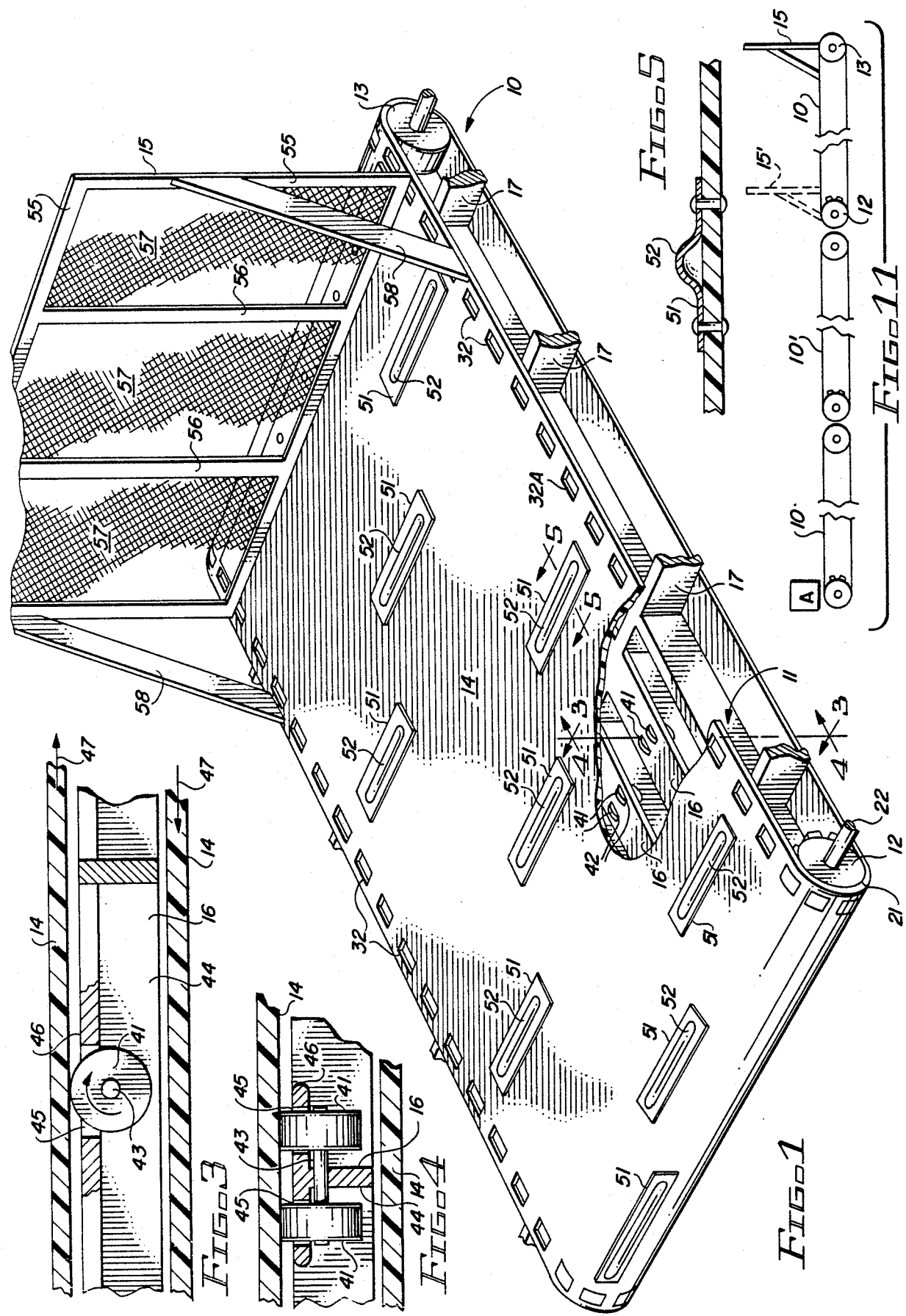

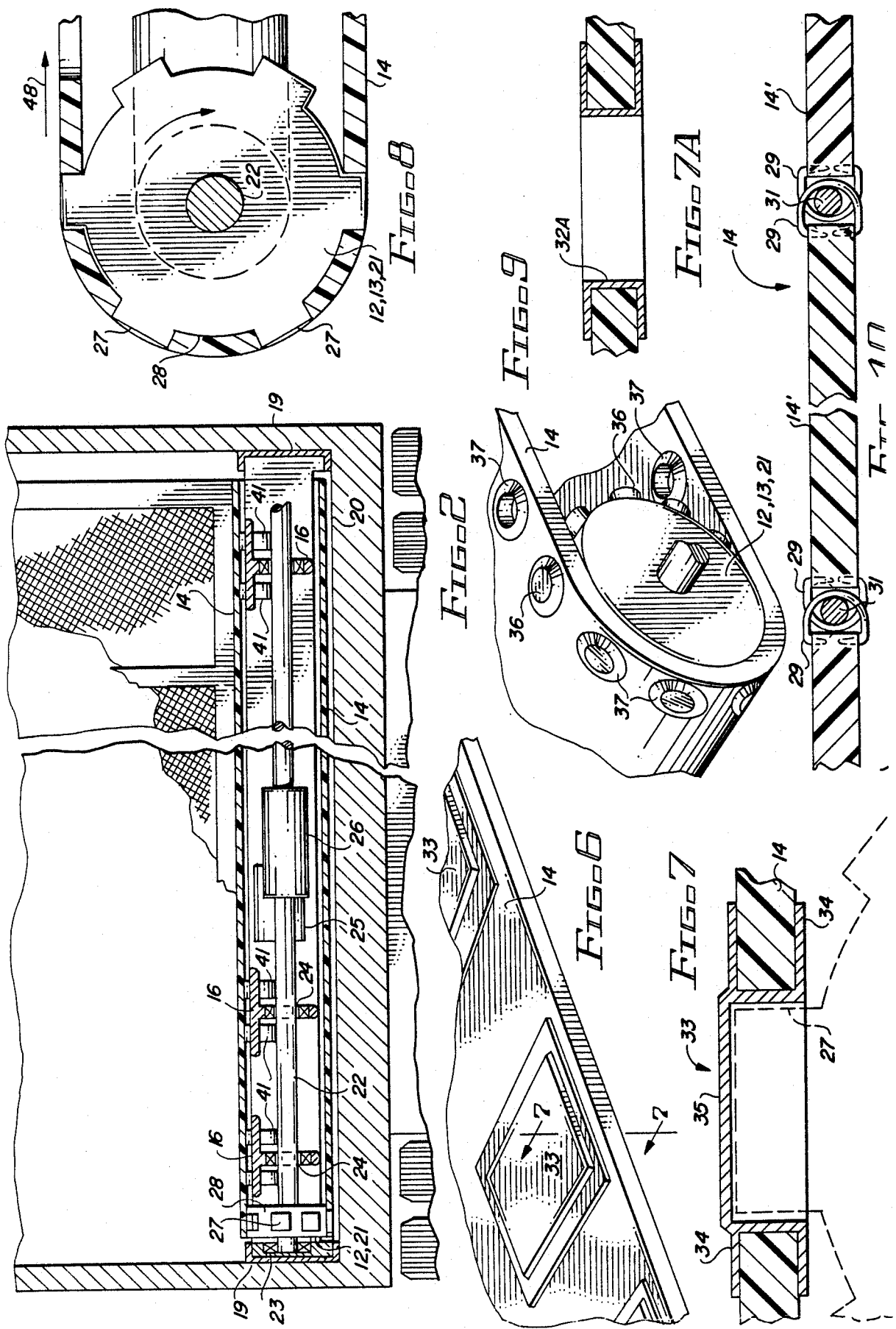

CONVEYOR FOR LOADING AND UNLOADING VEHICLES AND STORAGE FACILITIES

BACKGROUND OF THE INVENTION

A steadily increasing volume of cargo is transported by truck trailer and must be loaded into the trailer at its origin, unloaded from the trailer at freight terminals, and then sometimes reloaded on a local delivery truck and subsequently unloaded at its final destination. Where possible, cargo is placed on pallets which are carried by front-end loaders into and out of the truck trailers. While such loading is relatively fast, it possesses a notable risk factor for the operator and others who must operate the loader in narrow, often poorly lighted trailers in close proximity to heavy objects which can easily fall or tip within the trailer. When the cargo is of a type impossible to handle with a front-end loader or one which is not easily shipped on pallets, the cargo must be loaded on the trailer by hand labor. In any event, the cargo is always transferred from the loading dock to the trailer starting with the loading of the front end of the trailer and progressing rearwardly until the trailer has been filled to the doors at the rear cargo entrance, a distance of up to 50 feet. If loading by hand, a laborer must make many trips back and forth along the 50-foot trailer before it is filled to capacity. It has been estimated that six men can work for approximately six hours to completely load a 50-foot, over-the-road truck trailer, and such loading is very tedious for the cargo handlers and understandably expensive for the trucking companies.

Even if hand loading and unloading can be avoided and front-end loaders carry the cargo into and out of the trailers, a high element of risk is present when a 5,000 pound front-end loader enters the truck van carrying an additional load of several thousand pounds. An operator may not know until it is too late whether the truck flooring will hold the combined weight of the front-end loader and cargo, and any tipping or overturning of the heavily loaded loader in the narrow confines of the often darkened and crowded van interior can be extremely perilous. Often the driver of the front-end loader is assisted by a second worker who leads the front-end loader to inspect the necessary clearances and light the way while directing the driver of the loader. Accidents in which the lead workman is pinned against cargo or sidewalls or where cargo falls on him are not unusual, and accordingly, it is desirable to be able to load such trailers without driving the front-end loaders into the trailer.

When cargo is unloaded from the truck trailer at freight terminals or at the final destination, the unloading of the trailer presents the same dangers and difficulties as those described for loading. With large and heavy loads, many men or heavy equipment may be required to unload the trailer and many man-hours consumed while the expensive truck trailer remains idle and unable to continue its delivery missions until a substantial part of the load has been removed.

It is, therefore, highly desirable to be able to provide a truck trailer or other storage facility in which it is unnecessary to move cargo to the far end of the cargo space either by hand or by means of a front-end loader. It is also desirable to reduce the total number of man-hours required for loading or unloading various types of conveyors as have been proposed in the prior art, as solutions to these problems; the present invention offers improvements over such prior art devices.

DESCRIPTION OF THE PRIOR ART

A number of prior art devices have been offered over an extended period of time for moving cargo from one end of a wagon or truck to the other during a loading or an unloading operation. Typically, each such device incorporated a moving or movable conveyor and an upright wall that was carried along by the conveyor. The initially loaded cargo was stacked against the upright wall, the wall serving to prevent the initially stacked cargo from tipping over. In some cases, the wall also served as an end gate for the truck or other vehicle.

U.S. Pat. No. 1,030,155 discloses a haywagon incorporating a conveyor for moving hay to the front of the wagon. The conveyor comprises transverse slats fastened at both ends to chains or other flexible members. The chains are coupled through a clutch to a wheel of the wagon so that when the wagon is moving forward and the clutch is engaged, the conveyor moves the hay toward the front of the wagon.

U.S. Pat. No. 1,304,026 discloses a conveyor that folds up or telescopes as it moves to one end. Individual parts of the conveyor are coupled together and are preferably mounted on wheels.

U.S. Pat. No. 1,927,653 discloses a conveyor comprising a resilient belt, preferably of fabric or rubber that rests on a flat plate. One end of the belt is secured to an upright member. A chain secured at one end to the upright member passes over a drum or roller at the front end of the truck, then passes under the flat plate toward the rear of the truck. The rearward end of the belt passes over a drum or roller at the rear of the truck and then passes under the plate in a forward direction to be secured to the other end of the chain. The chain is moved in either direction by means of a power take-off or other driving means that is coupled to the chain by means of a worn gear and sprocketed drive wheel.

U.S. Pat. No. 3,722,717 discloses a conveyor comprising an endless belt or band that moves over a continuous grid of transverse rollers or over a smooth sheet metal floor. The conveyor is complete in itself rather than integral with the structure of the truck or trailer so that it may readily be installed in an existing vehicle or storage facility.

U.S. Pat. No. 3,998,343 discloses a conveyor incorporating a resilient belt that is moved over a grid of rollers with the edges of the belt secured at both sides to chains. The chains are coupled by means of sprockets to the rollers so that as the chains are driven in either direction, the rollers are forcibly turned to facilitate the motion of the belt as the belt is moved along with the chain.

While the prior art devices just described are effective to different degrees in serving the purposes toward which the present invention is directed, there is room for improvement or optimization in terms of achieving a practical balance between functionality and cost.

SUMMARY OF THE INVENTION

In accordance with the invention claimed, an improved conveyor means is provided for loading and unloading vehicles and other storage facilities. The conveyor means comprises an endless belt of heavy canvas or other resilient material reinforced at intervals by transverse ribs that extend at least part way across the width of the belt. The belt is driven by cogged rollers that engage reinforced openings at the edges of the band. The band is supported by a grid of longitudinal beams that carry rollers, the rollers serving to facilitate the movement of the belt and its cargo from one end of the conveyor to the other. An upright wall secured to the belt at one point supports the initially stacked cargo that is moved progressively toward the front of a truck as it is loaded from a rear opening.

It is, therefore, an object of the present invention to provide an improved conveyor means for loading and unloading vehicles and storage facilities.

Another object of the invention is to provide such a conveyor means in a sturdy form that is not unnecessarily limited in terms of the weight of the cargo that may be loaded upon it.

A further object of the invention is to provide such a conveyor in a form which permits movement of the cargo in either direction without the necessity of exerting excessively high forces upon the belt.

A still further object of the invention is to provide such strength and freedom of motion in a conveyor of this type without resorting to highly expensive mechanical structures.

A still further object of the invention is to provide a means for utilizing a relatively inexpensive resilient belt as the cargo carrier.

A still further object of the invention is to provide as an element of the conveyor an upright wall for support of the initially stacked cargo, the wall being fixed to the belt of the conveyor so that it moves toward the rear of the storage compartment as successive increments of cargo are loaded upon the conveyor.

Yet another object of the invention is to provide such a conveyor in a form that fully meets all requirements of functionality at a cost that will be found acceptable by potential users of the conveyor.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a perspective view of an improved conveyor means embodying the invention;

FIG. 2 is a fragmented view of the conveyor of FIG. 1 with the belt and other elements of the conveyor partially cut away to reveal details of its interior construction;

FIG. 3 is a cross-sectional side view of the conveyor as seen along line 3—3 of FIG. 1;

FIG. 4 is a cross-sectional end view of the conveyor as seen along line 4—4 of FIG. 1;

FIG. 5 is a cross-sectional view of the conveyor belt and a reinforcing rib as seen along line 5—5 of FIG. 1;

FIG. 6 is a fragmentary perspective view of the edge of the conveyor belt in a first embodiment;

FIG. 7 is a cross-sectional view of the conveyor belt as seen along 7—7 of FIG. 6;

FIG. 8 is a cross-sectional view showing the cogged roller and its coupling to the edge of the conveyor belt;

FIG. 9 is a partial perspective view showing a second embodiment of a cogged roller and its coupling to the edge of the conveyor belt;

FIG. 10 is a fragmented cross-sectional view of the conveyor belt illustrating the means by which sections of the belt are connected coupled together; and FIG. 11 is a simplified representation of three conveyor belts embodying the principles of the invention that are positioned end to end to extend the distance over which cargo may be moved in a loading, unloading or storage operation.

DESCRIPTION OF THE PREFERRED EMBODIMENT

Referring more particularly to the drawings by characters of reference, FIGS. 1-11 disclose a new and improved conveyor 10 embodying the invention comprising a support frame 11, forward and rear drive rollers 12 and 13, respectively, a conveyor belt 14, and an upright supporting wall 15.

Frame 11 comprises a grid of longitudinal and transverse members 16 and 17, respectively. The longitudinal members 16 extend the full length of frame 11 and preferably have an "I" or a "T" cross-sectional configuration for mechanical strength as shown in FIGS. 2 and 4. Longitudinal members 16 are closely spaced (six inches to one foot on centers), depending upon the expected loading in a given application. Each of the cross members 17 is made up of aligned individual segments in the form of flat webs that are welded in place between and at right angles to adjacent longitudinal members 16. Transverse members 17 are spaced apart three feet or more and extend at both sides beyond the outside longitudinal members 16 with their ends being joined by welding to support channels 19.

As shown in FIG. 2, there are two longitudinal support channels 19, one at each side of frame 11. The support channels have a "U"-shaped cross section, the legs of which extend toward frame 11. The ends of transverse members 17 fit inside the legs of the U-shaped channels 19, with the support channels 19 resting upon a supporting surface 20, such as the bed of a truck upon which conveyor 10 is mounted. Channels 19 support frame 11 in an elevated position relative to surface 20, leaving room between the under surface of frame 11 and support surface 20 for the passage of belt 14.

Frame 11 comprising the longitudinal and transverse members 16 and 17, and the support channels 19 welded together into a single rigid structure, constitutes a very sturdy support for cargo that is to be handled by conveyor 10.

As shown most clearly in FIG. 1, rollers 12 and 13 are mounted, one pair at each end of frame 11 in a parallel relationship with transverse members 17. As illustrated in FIG. 2, forward drive roller 12 actually comprises two relatively narrow rollers or wheels 21 mounted one at each end of a shaft 22. Shaft 22 is rotationally supported at both ends inside bearings 23 that are secured inside support channel 19. Shaft 22 passes through clearance holes 24 in longitudinal support members 16 and is driven by a motor means 25 including an on-off switch (not shown) which may be mounted at an acceptable spot at the loading door of a trailer and gear box 26. Drive rollers 13 are similarly constructed and mounted at the opposite end of frame 11. Both rollers 12 and 13 may be driven independently or one may be permitted to idle, depending upon the loading demands of a given application.

The construction of roller 21 is shown more clearly in FIGS. 2 and 8 and comprises ordinary wheels with square cogs 27 extending radially outwardly at spaced intervals about the periphery of rim 28 of the roller.

Conveyor belt 14 is in the form of an endless belt that longitudinally surrounds frame 11. It is preferably fabricated of a heavy canvas material or from a synthetic material of similar characteristics. The joining of sections 14' of such material to form the endless belt 14 may be accomplished through the use of "hog-ring" type clips 29 crimped into the abutting edges of adjoining sections 14' as shown in FIG. 10. A steel rod 31 is then passed through adjacent clips 29 that extend from juxtapositioned adjoining sections 14'.

As shown in FIGS. 1, 2 and 8, belt 14 passes over rollers 12 and 13 and is rotationally coupled thereto by means of uniformly spaced perforations 32 extending along both edges of belt 14. The perforations 32 are shaped to mate with cogs 27 of rollers 21. Thus, in the first embodiment of the invention as shown in FIGS. 1 and 2, the rectangular perforations 32 at both edges of belt 14 are penetrated and engaged by the square or rectangular cogs 27 of rollers 21.

Perforations 32 may be open with a metal reinforcing frame 32A about their peripheries as suggusted by FIG. 1, or they may utilize a pocket frame 33 as shown in FIG. 7. Pocket frame 33 has a peripheral frame 34 for reinforcement of the perforation and, in addition, it has an integral top cover 35 which prevents dust and debris from entering the perforation from the top surface of conveyor 10. It will be noted that in the case of pocket frame 33 of FIG. 7, cog 27 extends upward into the pocket-shaped interior or cavity of frame 33 that is formed by the peripheral frame 34 capped by cover 35. FIG. 6 shows two successively positioned pocket frames 33 as seen from the top surface of belt 14.

An alternate construction of rollers 21 utilizing circular or round cogs 36 and reinforced circular perforations 37 is shown in FIG. 9.

It will now be seen that as rollers 12 or 13 or both are driven by one or more motor means 25, belt 14, by virtue of its engagement at both edges with rollers 12 and 13, is moved longitudinally over the top surface of frame 11. It will also be recognized, however, that in the presence of a load of cargo resting upon belt 14, friction between the belt and the top surface of frame 11 will impede such longitudinal motion and will produce objectionable stresses in belt 14 and will also result in the heavy loading of motor means 25. Such stresses and heavy loading may be reduced by smoothly polishing the top surface of frame 11 where it will serve as a low-friction bearing surface for belt 14.

An alternate approach for reducing friction and in turn for reducing stresses on belt 14 and motor means 25 is to utilize a grid of support wheels or rollers 41 as shown in FIGS. 1, 2, 3 and 4. Rollers 41 which are one to three inches in diameter and approximately an inch wide are mounted in pairs 42 equally spaced apart along the lengths of longitudinal frame members 16. Each pair 42 of rollers 41 shares a common shaft 43 with shaft 43 being rotationally mounted in a vertical web 44 of the "I" beam or "T" beam comprising member 16. Shaft 43 is oriented horizontally and perpendicular to the length of member 16. Rectangular openings 45 formed in the top horizontal surface 46 of member 16 provide clearance for rollers 41 thereby permitting the upper edges of rollers 41 to extend through surface 46 a short distance so as to bear against the underside of belt 14 raising belt 14 off the surface of member 16. As belt 14 is moved in the direction of arrows 47, shown in FIG. 3, roller 41, being in contact with and supporting belt 14, causes belt 14 to rotate in a clockwise direction as shown by arrow 48 in FIG. 8.

Typically, cargo that is carried by truck trailers or stored in warehouses is stacked on flat pallets. When such a pallet is placed on conveyor belt 14, its weight will be distributed among the several pressure points which will occur at the locations of rollers 41. Under the motive force applied to belt 14 by motor means 25, the belt now moves freely by virtue of the fact that the rollers carry the weight of the cargo and are free to rotate within their own bearings. There is no transverse pressure between belt 14 and the top surface of frame 11 because rollers 41 raise the pallet and belt 14 off the top surface of the frame. Friction between belt 14 and frame 11 is thus virtually eliminated.

An additional consideration arises because of the means by which belt 14 is driven. Since belt 14 is driven by rollers 21 at its edges rather than by a distributed force or moment across its width, there is a tendency for the belt to be distorted under heavy loads. To reduce such distortion, an array of lateral stiffeners 51 is affixed to belt 14.

Each of the stiffeners comprises an elongated strip of metal into which has been formed a longitudinal ridge 52 as shown in FIGS. 1 and 6. The length of each stiffener 51 is approximately one-third the width of belt 15 and the locations of the stiffeners 51 are staggered. Thus, at a given location along the length of belt 14, there may be a stiffener at one edge of the belt; the next stiffener will be at the center; the succeeeding stiffener will be at the opposite edge; the next at the center, etc. The stiffening effect is thus distributed over the surface area of the belt.

An alternate approach is to employ stiffeners that are nearly as long as the belt is wide and then to space them uniformly along the length of the belt.

Upright supporting wall 15 as shown in FIG. 1 comprises a rectangular frame 55 with at least a pair of spaced vertically positioned ribs 56 covered by a sheet of metal 57. The base of frame 15 is secured along its length to belt 14 by means of rivets (not shown). Two braces 58, one at each side of the frame, support frame 55 in a substantially upright position. The lower end of each frame is secured one to each of the edges of belt 14, and the upper end of each frame is secured to the outer edge of wall 15 at about two-thirds its height from the base of the wall.

Operation

When installed in a truck trailer, conveyor 10 as shown in FIG. 1, is positioned with roller 12 at the rear opening of the trailer and with roller 13 at the forward wall of the trailer juxtapositioned to the cab. This is the proper orientation of conveyor 10 for loading the trailer from its rear door.

At the beginning of each loading operation, conveyor motor means 25 is operated by a suitable switching means mounted at the loading door of the trailer to move wall 15 to a position just inboard of the rear door of the trailer so that only a short loading space is left between roller 12 and wall 15. This space is then loaded with cargo, either by placing pallets upon belt 14 using a front end loader or by stacking boxes of materials directly upon the belt by hand. In the latter case, the wall serves to support the stacked cargo against lateral motion during subsequent movement of belt 14. When the first area of belt 14 has been loaded with cargo, the belt is advanced a short distance, moving wall 15 toward rollers 13 to provide another loading area immediately adjacent the previously loaded area and just inboard of the door of the trailer. Loading of the cargo proceeds in this manner until wall 15 has been moved all the way to the front of the trailer near roller 13, where its movement may be stopped by a further switch means associated with motor means 25.

Unloading proceeds in a similar manner as the belt is moved incrementally in the opposite direction to permit the unloading of cargo at the rear door of the trailer.

A modular version of conveyor 10 is shown in FIG. 11 wherein a first conveyor 10 that is identical to the version shown in FIG. 1 is placed at the far end of the trailer or storage compartment from the loading door. To accommodate trailers or compartments having lengths greater than the length of a standard conveyor 10, additional conveyors 10' are positioned for serial operation. The conveyors 10' are identical with conveyor 10, except that they are not equipped with an upright wall 15.

To load cargo using the arrangement of conveyors shown in FIG. 11, wall 15 of conveyor 10 is first moved to the position shown by its dash line image 15'. The loading of cargo then begins with the stacking of pallets or boxes on the left-hand end of conveyor 10' at position A, as shown in FIG. 11. Conveyors 10' are advanced in increments to permit continued loading at the same position until both conveyors 10' are fully loaded. As conveyors 10' are advanced further, cargo begins to be pushed into the receiving end of conveyor 10, pressing against wall 15 at position 15'. If provision is made for both rollers 12 and 13 of conveyor 10 to function as idlers, it will not be necessary to operate motor means 25 of conveyor 10. As the motor means driving conveyors 10' continue to advance the loaded cargo, the pressure of the cargo against wall 15 will move the cargo and wall 15 forwardly over conveyor 10 until wall 15 is directly over roller 13 at the front of the trailer with the trailer fully loaded. Unloading, of course, proceeds as described earlier with all three conveyors moving incrementally in the opposite direction.

An improved conveyor is thus provided in accordance with the stated objects of this invention and achieves, by virtue of its frame design and welded beam construction, an improved sturdy and heavy duty structure. Rollers 41 incorporated for reducing friction under the belt are considerably less expensive than the longer load-bearing rollers employed in the prior art, especially when the conveyor is designed for heavy loads. The flexible belt 14 with its perforated edges and stiffeners also constitutes a totally functional yet inexpensive improvement over prior art devices.

Although but two embodiments of the invention have been illustrated and described, it will be apparent to those skilled in the art that various changes and modifications may be made therein without departing from the spirit of the invention or from the scope of the appended claims.

What is claimed is:

1. A conveyor for loading and unloading vehicles and other storage facilities comprising:
   an elongated substantially rectangular frame formed of a plurality of spaced elongated members interconnected by a plurality of spaced cross members, and said frame having a length, width and predetermined thickness,
   a pair of roller means, one journaled at each end of said frame,
   said roller means, each comprising a pair of similar shaft mounted cog wheels, one wheel of each roller means being positioned at each side of said frame and at each end thereof,
   said cog wheels, each having a plurality of teeth spacedly arranged around the periphery of said wheels,
   an endless conveyor belt having a width substantially equal to the width of said frame, top and bottom surfaces and being longitudinally mounted around said frame,
   said belt having a plurality of perforations spacedly arranged along each edge thereof and positioned for penetration of the teeth of said wheels upon rotation thereof,
   said cog wheels having a diameter larger than the thickness of said frame for holding said belt away from the top and bottom surfaces of said frame upon movement of said belt over said frame,
   a plurality of rollers rotatively mounted on said frame at positions along its length for engaging the bottom surface of said belt upon rotation thereof for supporting its load,
   each of said rolelrs comprising a pair of wheels spacedly mounted on a common shaft with each wheel of a given pair being mounted on different sides of an associated elongated member of said frame,
   a plurality of stiffeners mounted on the top surface of said belt and positioned to extend laterally across said belt, and
   motor means operatively connected with one of said roller means for driving said conveyor belt to advance a load along said belt in one direction and sequentially in the reverse direction thereof.

2. The conveyor set forth in claim 1 wherein:
   said elongated members comprise I-beam configurations, and
   said shaft of each pair of rollers extends through a web of an associated I-beam in a direction laterally of the longitudinal axis of said elongated members.

3. The conveyor set forth in claim 1 wherein:
   the outer periphery of each of said wheels is approximately one inch wide.

* * * * *

UNITED STATES PATENT OFFICE
CERTIFICATE OF CORRECTION

Patent No. 4,747,747          Dated May 31, 1988

Inventor(s) Salvatore M. Fusco and Lloyd Fogel

It is certified that error appears in the above-identified patent and that said Letters Patent are hereby corrected as shown below:

Claim 1, line 36, cancel; "rolelrs" and substitute ---rollers---.

Signed and Sealed this

Eighteenth Day of October, 1988

*Attest:*

DONALD J. QUIGG

*Attesting Officer*      *Commissioner of Patents and Trademarks*